(12) United States Patent
Willigan et al.

(10) Patent No.: US 10,486,167 B2
(45) Date of Patent: Nov. 26, 2019

(54) PREVENTION OF DEPOSITS ON ENGINE COMPONENTS

(71) Applicant: Delavan Inc, West Des Moines, IA (US)

(72) Inventors: Rhonda R. Willigan, Manchester, CT (US); Haralambos Cordatos, Colchester, CT (US)

(73) Assignee: Delavan Inc., West Des Moines, IA (US)

( * ) Notice: Subject to any disclaimer, the term of this patent is extended or adjusted under 35 U.S.C. 154(b) by 407 days.

(21) Appl. No.: 15/209,074

(22) Filed: Jul. 13, 2016

(65) Prior Publication Data

US 2018/0015484 A1    Jan. 18, 2018

(51) Int. Cl.
| | |
|---|---|
| *B03C 5/00* | (2006.01) |
| *B01D 29/05* | (2006.01) |
| *B01D 35/00* | (2006.01) |
| *B01D 35/06* | (2006.01) |
| *C10M 175/00* | (2006.01) |

(52) U.S. Cl.
CPC .............. *B03C 5/005* (2013.01); *B01D 29/05* (2013.01); *B01D 35/005* (2013.01); *B01D 35/06* (2013.01); *C10M 175/0066* (2013.01); *C10M 175/0091* (2013.01); *B01D 2201/02* (2013.01); *B01D 2201/50* (2013.01)

(58) Field of Classification Search
CPC ........ B03C 5/005; B01D 29/05; B01D 35/005
See application file for complete search history.

(56) References Cited

U.S. PATENT DOCUMENTS

| | | | |
|---|---|---|---|
| 4,620,917 A | | 11/1986 | Nozawa et al. |
| 5,647,965 A | * | 7/1997 | Crose ...................... B03C 5/024 |
| | | | 204/551 |
| 6,260,540 B1 | | 7/2001 | Hiraiwa et al. |
| 6,736,965 B2 | * | 5/2004 | Cousineau ........... B01D 29/096 |
| | | | 210/104 |

(Continued)

FOREIGN PATENT DOCUMENTS

GB    1308470 A    2/1973

OTHER PUBLICATIONS

Shen, Yueyang & Elele, Ezinwa & Khusid, Boris. (2011). A novel concept of dielectrophoretic engine oil filter. Electrophoresis. 32. 2559-68. 10.1002/elps.201100072.*

(Continued)

*Primary Examiner* — Kevin A Lathers
(74) *Attorney, Agent, or Firm* — Locke Lord LLP; Daniel J. Fiorello; Joshua L. Jones

(57) ABSTRACT

A fuel and/or lubricant system for an engine can include an engine component configured to be in fluid communication with the fuel and/or lubricant, and an alternating current (AC) source electrically connected to the engine component to create an electric field of alternating polarity to subject particles within the fuel and/or lubricant to dielectrophoresis as the fuel and/or lubricant passes through the electric field to prevent deposits from forming on the engine component. In certain embodiments, the engine component can be a filter screen configured to filter the fuel and/or lubricant to subject particles within the fuel and/or lubricant to dielectrophoresis as the fuel and/or lubricant passes through the filter screen.

14 Claims, 3 Drawing Sheets

(56) References Cited

U.S. PATENT DOCUMENTS 9,192,942 B2 11/2015 Choi et al.
2006/0260944 A1 11/2006 Madou et al.

OTHER PUBLICATIONS

Extended European Search Report, of the European Patent Office, dated Dec. 1, 2017, issued in corresponding European Patent Application No. 17181270.4.

* cited by examiner

PREVENTION OF DEPOSITS ON ENGINE COMPONENTS

BACKGROUND

1. Field

The present disclosure relates to engines and filter systems, more specifically prevention of deposits on engine components (e.g., of a turbomachine).

2. Description of Related Art

Carbonaceous deposits ("varnish" and/or "coke") on aircraft fuel system components can cause many issues such as sluggishness in the response of servo valves, reduced power due to plugged fuel nozzles and heat exchangers, in-flight engine shut-downs due to plugged "wash flow filters", and/or fuel nozzle plugging and fuel spray degradation. Until recently, formation of these deposits was being kept in check by maintaining an average fuel temperature of less than 250 degrees F. Under such conditions, the typical engine could operate for thousands of hours between overhauls without experiencing any major problems.

Increased heat loads, projected today for advanced future aircraft, will naturally drive to higher average fuel temperatures. Unfortunately, the chemical reaction rates leading to carbonaceous deposits are generally exponential with temperature. Hence, one can predict that a seemingly small increase in fuel temperature can result in a disproportionate increase in carbonaceous deposit formation. Varnish is, in fact, found on many different surface types, including Teflon and SiO2 coated surfaces, which were expected to be inert and therefore immune to such deposits.

Thus, at the operating temperatures of a typical aircraft fuel-draulic system, it can be concluded that it is not the metal surface of the screen that cause these deposits to form. Rather, these deposits have already formed in the fuel and the screen is simply collecting the portion of particles that have grown to appreciable size. Additive packages exist that can be used to prevent varnish formation. Deoxygenation schemes could also be used also to prevent oxygen attack of the fuel molecules. Continuous, on-line electrostatic oil cleaners could also be used to remove deposited varnish from surfaces. However, such chemical additions, or large systems, are not desirable because they are either outside of the control of the aircraft engine manufacturer or add too much weight and volume in the fuel system.

Such conventional methods and systems have generally been considered satisfactory for their intended purpose. However, there is still a need in the art for improved deposit prevention. The present disclosure provides a solution for this need.

SUMMARY

A fuel and/or lubricant system for an engine can include an engine component configured to be in fluid communication with the fuel and/or lubricant, and an alternating current (AC) source electrically connected to the engine component to create an electric field of alternating polarity to subject particles within the fuel and/or lubricant to dielectrophoresis as the fuel and/or lubricant passes through the electric field to prevent deposits from forming on the engine component. In certain embodiments, the engine component can be a filter screen configured to filter the fuel and/or lubricant to subject particles within the fuel and/or lubricant to dielectrophoresis as the fuel and/or lubricant passes through the filter screen.

The system can include an insulating ring disposed around the filter screen to electrically isolate the filter screen from a fluid pipe. The AC source can be electrically connected to the fluid pipe via a fluid pipe cable. Also, the fluid pipe cable can be grounded.

The conductive material can be coated with a non-conductive material. In certain embodiments, the AC source can include high voltage and low amperage.

In certain embodiments, the filter screen can be a flat screen or a conical screen. Any other suitable shape is contemplated herein.

In accordance with at least one aspect of this disclosure, a method for preventing deposits from forming on one or more engine components exposed to a fuel and/or lubricant can include providing an alternating current (AC) to one or more engine components to create an electric field of alternating a polarity around the one or more engine components. Providing the AC can include providing a high voltage, low amperage electrical current.

Providing the AC can include providing the AC to a fuel filter of a turbomachine. In certain embodiments, providing the AC includes providing the AC to a fuel pipe that is electrically isolated from the fuel filter.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
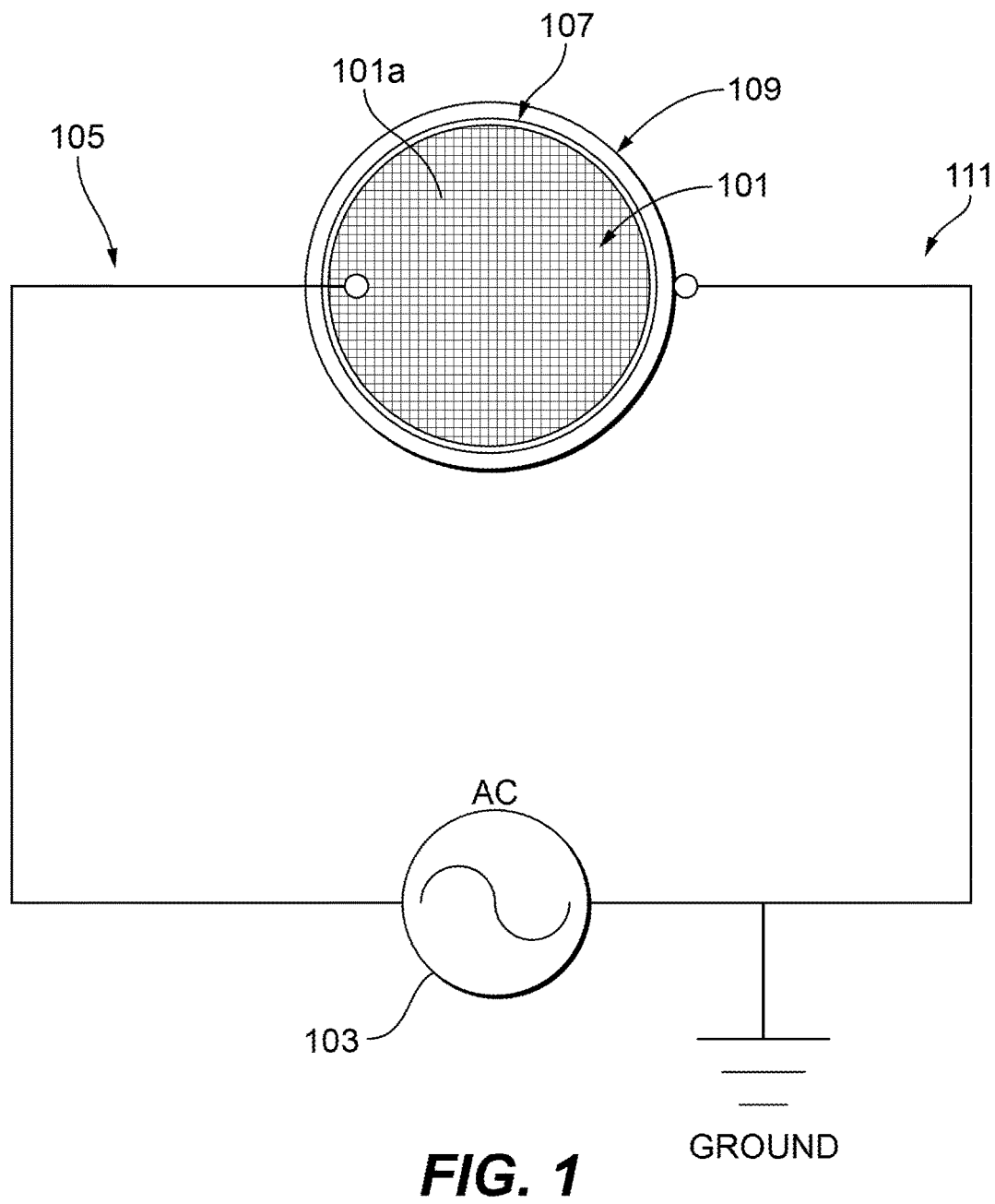
FIG. 1 is a schematic diagram of an embodiment of a system in accordance with this disclosure, shown having a flat filter screen.
Figure 2A:
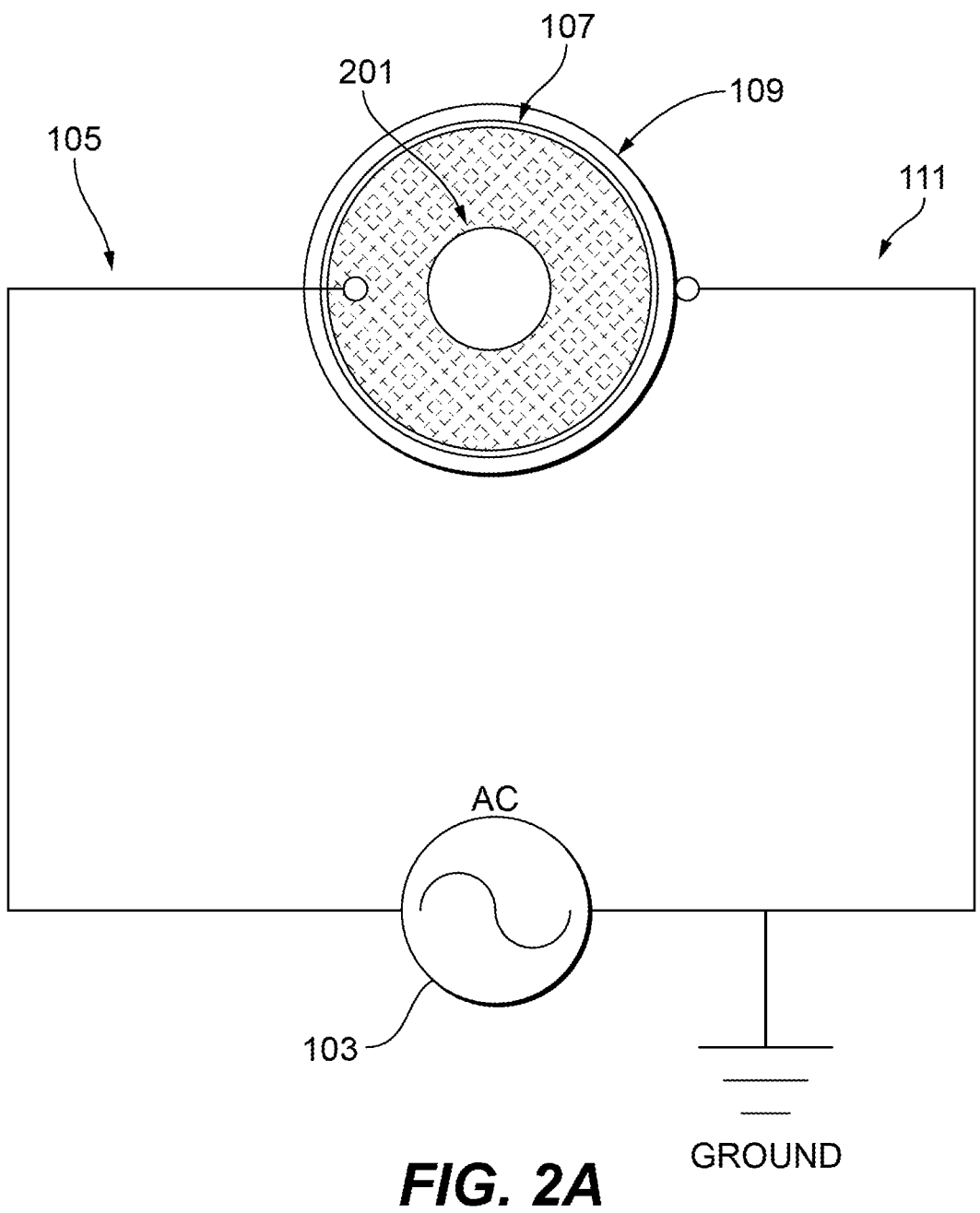
FIG. 2A is a schematic diagram of an embodiment of a system in accordance with this disclosure, shown having a conical filter screen.
Figure 2B:
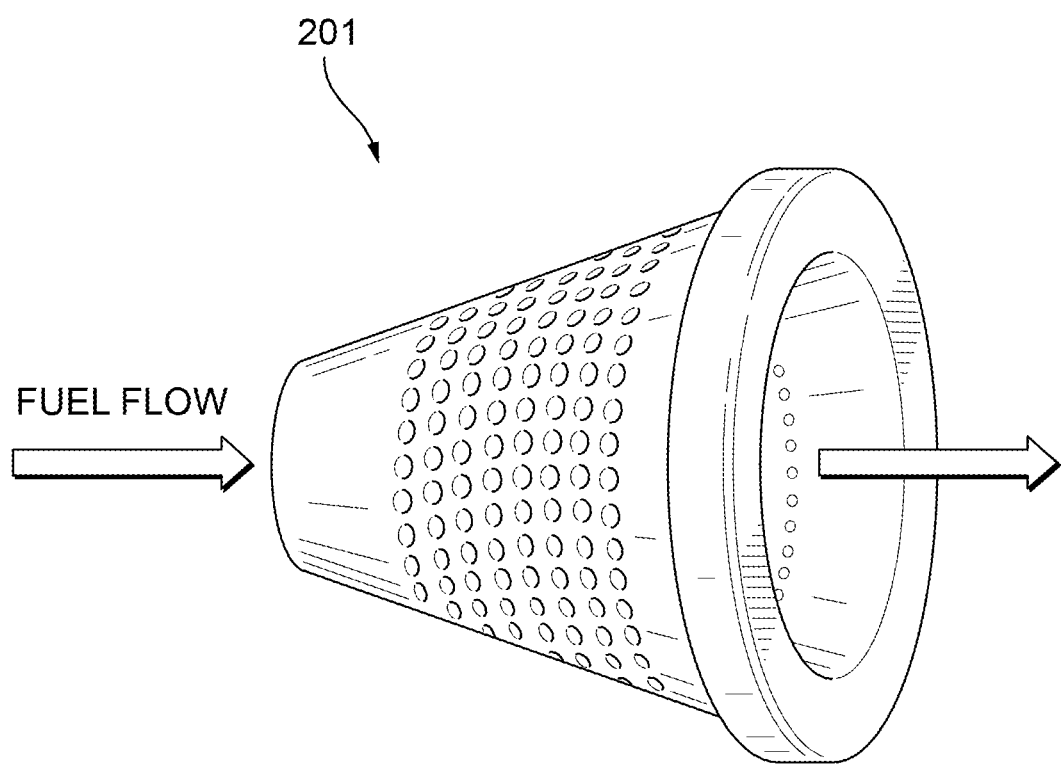
FIG. 2B is a side view of an embodiment of the conical filter screen of FIG. 2A.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2A and 2B. The systems and methods described herein can be used to prevent deposits (e.g., coke/varnish) from forming on engine components.

Referring to FIG. 1, a fuel and/or lubricant filter system 100 for an engine can include a engine component (e.g., filter screen 101) configured to filter a fluid (e.g., kerosene based fuel, engine lubricant). The system 100 also includes an alternating current (AC) source 103 electrically connected to the engine component (e.g., filter screen 101) via a first cable 105. The AC source creates an electric field around the engine component with an alternating polarity to subject particles in the fluid in the immediate vicinity of the engine component to dielectrophoresis (e.g., as the fluid passes through the filter screen 101) to prevent deposits from forming on the filter screen 101 (e.g., to counteract dipole-dipole attractive forces between the coke/varnish particles and the filter screen mesh).

While filter screens are described herein, any suitable engine component (e.g., pipes, flow channels, vanes, pumps, etc.) that is in fluid communication with fuel and/or lubricant can be connected to the AC source 103 as appreciated by those having ordinary skill in the art in view of this disclosure. As such, this disclosure is not limited to the application of alternating current to filter screens.

As appreciated by those skilled in the art, the filter screen 101 can include a mesh 101a formed of a conductive material (e.g., stainless steel or any other suitable metal). Any other suitable material to generate the dielectrophoretic effect is contemplated herein (e.g., a dielectric material).

The system 100 can include an insulating ring 107 disposed around the filter screen 101 to electrically isolate the filter screen 101 from a fluid pipe 109 (e.g., a fuel pipe, a lubricant pipe). The AC source 103 can be electrically connected to the fluid pipe via a fluid pipe cable 111. Also, the fluid pipe cable 111 can be grounded as shown in FIG. 1.

In certain embodiments, the conductive material can be coated with a non-conductive material (e.g., Teflon or any other suitable polymer, a ceramic, a semiconductor, a dielectric material), in addition to or independent of an insulating ring 107 as described above. For example, the conductive material can be coated with a layer that includes at least one of a polymer, films, other dielectric substrate, glass, resin, plastic substrate, epoxy, or any other suitable dielectric material. The thickness and/or the rigidity of the coating layer can be adjusted to provide necessary mechanical support and to allow for the suitable generation and penetration of electromagnetic fields. Such a layer can control surface resistivity such that the electrostatic charge accumulated on the surface is allowed to decay at a controlled rate, for example.

In certain embodiments, the AC source 103 can include high voltage and low amperage to maximize the dielectrophoretic effect. An example of suitable power input can include about 1,050 V at about 1 mA. In certain embodiments, voltage may not exceed about 1,400 V and current may not exceed about 2 mA. Any other suitable power inputs are contemplated herein.

In certain embodiments, the filter screen 101 can be a flat screen (as shown in FIG. 1). As shown in FIGS. 2A and 2B, a filter screen 201 can be a conical screen. Any other suitable shape, size, and or function for the filter screen 201 are contemplated herein. Moreover, while embodiments have been discussed in terms of filter screens 101, 201, it is contemplated herein that an AC source can be connected to any suitable engine component that is in contact with a fluid that causes deposits thereon. Alternating polarity of the engine component at one or more terminal points can progressively advance even weakly dielectric particles in a fluid flow due to particle motion caused by the dielectrophoretic effect, motion which prevents the particles from sticking to a surface of the engine component.

In accordance with at least one aspect of this disclosure, a method for preventing deposits from forming on one or more engine components exposed to a fuel and/or lubricant can include providing an alternating current (AC) to the one or more engine components (e.g., a fuel or lubricant filter) to alternate a polarity of the one or more engine components. Providing the AC can include providing a high voltage, low amperage current.

Providing the AC can include providing the AC to a fuel filter of a turbomachine. In certain embodiments, providing the AC includes providing the AC to a fuel pipe that is electrically isolated from the fuel filter.

As appreciated by those having ordinary skill in the art, dielectrophoresis is the act of exerting a force on a dielectric particle when it is subjected to a non-uniform electric field. This force does not require the particle to be charged. All particles exhibit dielectrophoretic activity in the presence of electric fields. Certain fuel can be described as a naturally polar (that is, possessing a zero net charge, but having charge distribution within the particle that creates positive and negative charges). Previous devices use constant potential to attract precursors of varnish but these devices are not suitable for high flow rate fuel, for example.

As described above, an electric field can be applied in such a way that the potential on the engine component surface, or leading up to it, alternates from positive to negative, thereby "confusing" varnish particles and causing the particles to flow through the screen and not be captured. Again, binding to screen is prevented because the flow carries the constantly shifting varnish particle through the filter. Even if polar particles are temporarily attracted, such particles will become repelled as long as frequency of polarity change is fast enough to overcome rotational inertia of particle while the particle is flipping Embodiments as described above prevent deposits from forming on engine components (e.g., carbonaceous deposits). With respect to filters, plugging of screens (e.g., "last-chance screens" in an engine fuel metering unit (FMU)) is prevented or at least delayed. Embodiments allow for use of fuel and lubricant having higher temperatures since certain deposits can be controlled even at higher heats. This improves engine efficiency and the ability of other systems to use fuel and/or lubricant as coolant.

The methods and systems of the present disclosure, as described above and shown in the drawings, provide for prevention of deposits in engine components exposed to fuel and/or lubricant, for example. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fuel and/or lubricant system for an engine, comprising:
   an engine component configured to be in fluid communication with the fuel and/or lubricant; and
   an alternating current (AC) source electrically connected to the engine component to create an electric field of alternating polarity to subject particles within the fuel and/or lubricant to dielectrophoresis as the fuel and/or lubricant passes through the electric field to prevent deposits from forming on the engine component, where the engine component is a filter screen configured to filter the fuel and/or lubricant to subject particles within the fuel and/or lubricant to dielectrophoresis as the fuel and/or lubricant passes through the filter screen.

2. The system of claim 1, wherein the filter screen includes a mesh formed of a conductive material.

3. The system of claim 2, further comprising an insulating ring disposed around the filter screen to electrically isolate the filter screen from a fluid pipe.

4. The system of claim 3, wherein the AC source is electrically connected to the fluid pipe via a fluid pipe cable.

5. The system of claim 4, wherein the fluid pipe cable is grounded.

6. The system of claim 2, wherein the conductive material is coated with a non-conductive material.

7. The system of claim 1, wherein the AC source includes high voltage and low amperage.

8. The system of claim 1, wherein the filter screen is a flat screen.

9. The system of claim 1, wherein the filter screen is a conical screen.

10. A method for preventing deposits from forming on one or more engine components exposed to a fuel and/or lubricant, the method comprising:
    providing an alternating current (AC) to the one or more engine components to create an electric field of alternating a polarity around the one or more engine components, wherein providing the AC includes providing a high voltage, low amperage current.

11. The method of claim 10, wherein the one or more engine components include a fuel filter, wherein providing the AC includes providing the AC to the fuel filter of a turbomachine.

12. The method of claim 11, wherein the one or more engine components include a fuel pipe, wherein providing the AC includes providing the AC to the fuel pipe that is electrically isolated from the fuel filter.

13. A method for preventing deposits from forming on one or more engine components exposed to a fuel and/or lubricant, the method comprising:
    providing an alternating current (AC) to the one or more engine components to create an electric field of alternating a polarity around the one or more engine components, wherein the one or more engine components include a fuel filter, wherein providing the AC includes providing the AC to the fuel filter of a turbomachine.

14. A method for preventing deposits from forming on one or more engine components exposed to a fuel and/or lubricant, the method comprising:
    providing an alternating current (AC) to the one or more engine components to create an electric field of alternating a polarity around the one or more engine components, wherein the one or more engine components include a fuel pipe, wherein providing the AC includes providing the AC to the fuel pipe that is electrically isolated from a fuel filter.

* * * * *